Oct. 7, 1947.  J. PIATAK  2,428,680
TRACTION SUPPLY DEVICE
Filed June 27, 1945
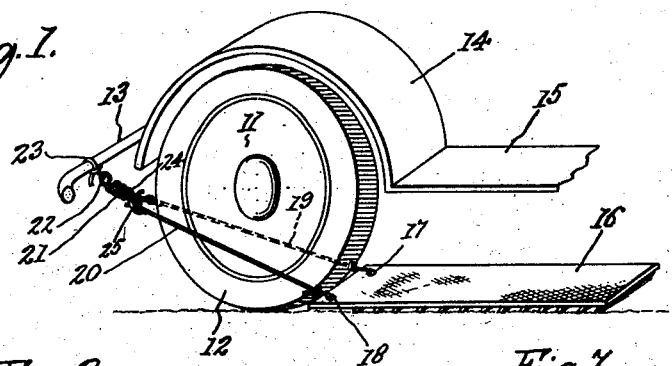
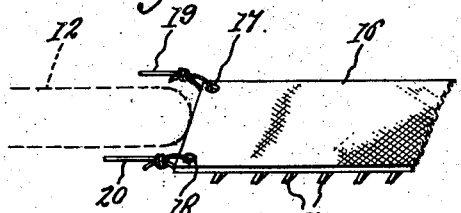
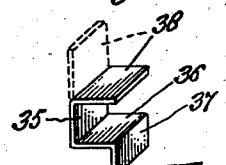
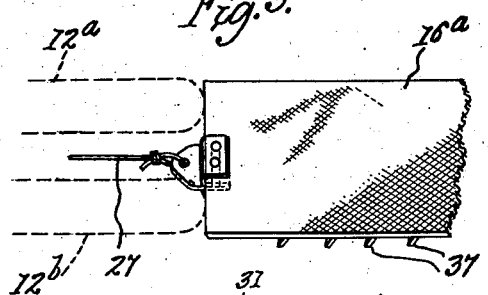
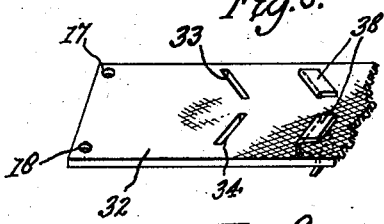
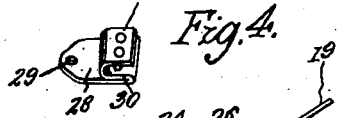
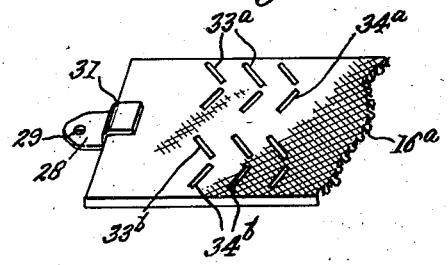
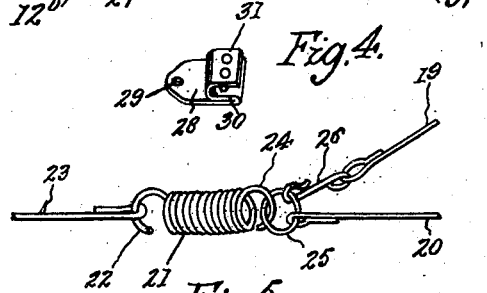
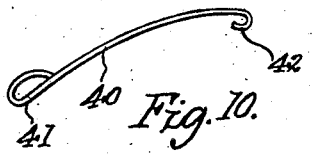
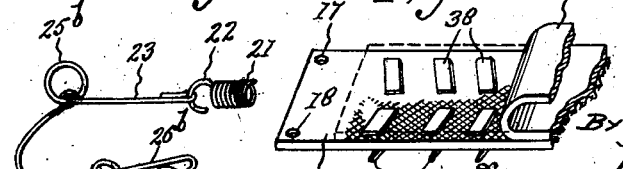
Inventor
Joseph Piatak
By Mawhinney & Mawhinney
Attorneys Patented Oct. 7, 1947

2,428,680

UNITED STATES PATENT OFFICE 2,428,680

TRACTION SUPPLY DEVICE

Joseph Piatak, Gary, Ind.

Application June 27, 1945, Serial No. 601,789

5 Claims. (Cl. 238—14)

1

The present invention relates to improvements in traction supply devices and more particularly relates to a device for attachment to automobiles when the same are stalled in mud or soft ground or due to insufficient traction from any cause, such as ice, snow, wet clay or ruts in which the pulling wheels of a motor vehicle rotate without however setting the car in motion.

An object of the invention is to provide a mat or pad of durable and flexible material constructed and arranged to be entered beneath the tire of one of the rear wheels of an automobile and having a spring or other yieldable connection to the rear bumper or other part of the vehicle in such a manner as to apply appropriate tension to the mat for the purpose of entering it beneath the tire when the wheel is rotated by engine power.

Another object of the invention is to provide a mat or pad of flexible and durable material which will adapt itself to any irregularities in the surface of a road, thereby providing better mat grip and less strain to the mat body.

Another object of the invention is to provide an improved traction device affording a temporary tractable surface to overcome the conditions as above set forth.

A further object of the invention resides in providing an improved traction device having lugs or cleats to take into the snow, mud, soft ground and the like to give the necessary traction to enable the vehicle to pull out of the soft spot.

A still further object of the invention is to provide an improved traction device in which the cleats or lugs are so constructed and arranged as to be easily attached to the traction mat, the relative arrangement of the cleats serving to prevent side slipping and procure a firm footing.

A further object of the invention is to provide a reacher hook to simplify the application of the traction device to a vehicle.

A still further object of the invention is to provide a double or extension mat for those cases in which dual tires are employed.

The invention also contemplates simplicity and facility of operation and cheapness of manufacture.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of a portion of an automobile and its traction wheel illustrating my improved traction device as applied thereto and to the rear bumper, Figure 2 is a top perspective view of the improved mat partly broken away with the leaders also broken away and showing the vertical tire in broken lines, Figure 3 is a view similar to Figure 2 illustrating the double or extension mat for the dual tires, shown in broken lines, Figure 4 is a perspective view of a novel form of mat clamp employed, Figure 5 is a perspective view of the spring and its attached parts, Figure 6 is a fragmentary perspective view, with parts broken away and parts shown in section, of the cleated mat, Figure 7 is a perspective view of a novel form of cleat or lug employed, Figure 8 is a fragmentary perspective view of a mat in the single form showing the relative disposition of the cleats in two rows, Figure 9 is a similar view of the extension or double mat showing a relative arrangement of cleats or lugs in four rows, Figure 10 is a perspective view of the reacher hook, and Figure 11 is a perspective view of a modified form of bumper attaching device.

Referring more particularly to the drawings, 11 designates the wheel and 12 the tire thereon of an automobile or other vehicle having the rear bumper 13, fender 14 and running board 15.

The improved mat is illustrated generally at 16, the same being constructed as hereinafter described.

In the forward portion of the mat are perforations 17 and 18 for the attachment of leaders 19 and 20. As shown in Figure 2 the width of the mat will slightly exceed that of the vehicle tire 12. The holes 17 and 18 are at corner portions of the mat whereby the leaders 19 and 20 are disposed at opposite sides of the wheel 11.

The leaders converge rearwardly and meet in a spring 21 adapted to be attached to the rear bumper 13. For this purpose the rear convolution of the spring may be formed into a hook 22 engaged by a tie wire 23 which may be looped or otherwise engaged with the bumper 13. As shown in Fig. 11 leader 23 has a ring 25$^b$ adjustable therealong by singly knotting the leader through the ring. A hook 26$^b$ on the free end of leader 23 may be engaged with 22 or 25$^b$, Distance of ring 25ᵇ to hook 26ᵇ to be determined by user of the mat. The leaders 19 and 20 may be of wire, cable or other appropriate material suitable to withstand the strain to which they are imposed.

The forward end of the helical spring 21 may also be formed into a hook 24 for engagement by a ring 25 to which the rear end of the leader 20 may be affixed. The rear end of the companion or inside leader 19 preferably carries a clasp hook 26 for detachable engagement with the ring 25.

In the form of the invention shown in Figure 3 where dual tires 12ᵃ and 12ᵇ are employed as in heavy trucks, a form of mat 16ᵃ of substantially the width of the tread of the entire double wheel 12ᵃ, 12ᵇ is employed. In this instance the leaders 19 and 20 are dispensed with and a single leader 27 employed in conjunction with a form of clamp illustrated in Figure 4. This clamp is generally in the form of an H, made of sheet metal with a body 28 having a perforation 29 through which the forward end of the leader 27 is passed and then twisted upon the shank of such leader 27 to affix the leader to the clamp.

The jaws 30 and 31 of the clamp are folded from the sheet metal into substantially U-shape so as to grasp a central portion of the mat 16ᵃ in alignment with the space between the wheels 12ᵃ and 12ᵇ. The jaws 30 and 31 are preferably riveted to the mat as indicated in Figure 3. The leader 27 will extend to the spring 21 and the spring will be attached to the bumper 13 as already described.

The mat is formed preferably as shown in Figures 6–9 inclusive in which a heavy body 32 of cord fabric impregnated with rubber or other suitable material constitutes the base of the mat. For the single form of mat illustrated in Figure 3 rows of slots 33 and 34 are provided to receive the cleats or lugs of the form shown in Figure 7.

This Figure 7 shows a convenient form of lug in which 35 represents the shank of the lug which is normally in the straight vertical position as indicated in dotted lines, in which state the shank 35 is passed upwardly through a slot 33, 34 until the flange 36 encounters the bottom surface of the mat base 32 with the tooth 37 of the lug or cleat extending downwardly from the lower surface of the mat. Thereupon all that portion of the shank 35 lying above the mat base 32 is bent over at substantially right angles and clenched down upon the upper face of the mat base 32 as shown in Figure 8, these clenched over portions forming flanges 38.

By referring to Figure 8 it will be seen that the slots 33 and 34 for receiving the lugs are diagonally disposed in inverse order and that the first lug from the wheel end of the mat is located quite a distance from the rear end of the mat. This is for the purpose of providing a suitable entrance apron for the mat adjacent the tire 12 which will be devoid of any lugs and will therefore lay flat upon the ground for the purpose of better entering the mat beneath the tire. The mat may be made of any length desired and have as many cleats or lugs as desired or found necessary.

Referring to Figure 9 four rows of diagonal slots 33ᵃ, 34ᵃ, 33ᵇ and 34ᵇ are provided in a double width or extension mat 16ᵃ. Preferably adjacent rows of the diagonal slots will be mutually reversed.

As shown in Figure 6 a backing sheet 39 of rubber or other flexible material is cemented, vulcanized or otherwise secured over the upper face of the body 32 of the flexible mat after the cleats have been put in place in order that this sheet may cover and hold down the clenched over flanges 38 of such cleats, also a more tractable surface is provided for the tire.

Referring more particularly to Figure 10 a reacher hook is shown as composed of a long metal rod 40 having a handle or loop 41 at one end and an open bill at its other end. The shank 40 is preferably slightly rounded and of a length to extend back of the wheel 11, the handle 41 being held in one end while the bill 42 reaches back to the spring link 25 so as to attach the hook 26 of the inner leader 19 to the ring 25.

In the use of the device, Figure 1 shows the new elongated mat placed in the proposed position against the revolving wheel 11 which is adapted to turn clockwise. Also it shows how the spring 21 is fastened between the leaders 19, 20 on the one end and the rear leader 23 on the other end. The overall length of these leaders and the spring is such that the spring is stretched or put under tension when the mat is engaged in front of the tire 12.

One order of assembly may be as follows, although I do not wish to be restricted to the same, this being merely by way of example. With the mat off to one side of the wheel 12 the rear leader 23 is secured by clasp hook 26ᵇ and ring 25ᵇ to the bumper 13. Thereupon the mat is brought forward of the wheel 12 with the leader 20 extending on the outside of the tire and with the clasp hook 26 having been previously released from the ring 25.

This leader 19 is then passed from the front of the wheel inwardly of the tire back to the ring 25. For this purpose the reacher hook 40 shown in Figure 10 is a convenient tool. By its use the clasp hook 26 may be passed back of the tire and engaged in the ring 25. It will be understood that in performing this operation the spring 21 will have to be stretched forwardly and put under tension whereby it pulls upon both of the leaders 19, 20 to wedge the apron portion of the mat in below the tread of the tire at the nip of the tire with the road surface.

Consequently when the wheel 11 begins to rotate, the tire 12 will walk up on the mat. In other words the wheel will force the mat along backwardly under the same, the cleats 37 engaging with the soft material and biting into the same to give sufficient traction whereby the wheel may roll along the mat out of the stalled position.

The clasp hook 26 of the leader 19 is such that it easily attaches the leader to the ring 25. Thus the leaders 19 and 20 enclose the tire. The purpose is to keep the mat balanced when under tension otherwise one leader would pull the mat to one side out from under the tire. The apron arrangement allows the mat to slide a few inches under the revolving tire. The mat then comes to a stop due to the cleats or lugs engaging the soft spot. Thus a firm temporary tractable surface is supplied.

The diagonal arrangement of the lug rows are reverse to each other. This is to prevent side slipping and to procure a firm footing for the mat. Whenever the tire is resting on a particular lug, that lug is under stress and therefore it is held firm by the wheel.

The desirability of securing the leader 23 to the bumper 13 or other part of the vehicle has a number of advantages: In the first place it prevents loss of the mat, the mat being retrieved as the vehicle moves along; in the second place it allows the vehicle to proceed to a safe spot before detaching the device; and thirdly the driver does not need outside help to apply the device.

It will be appreciated that the improved traction supply device is a time saver and a money saver.

It is obvious that various changes and modifications may be made in the details of construction and design of the above specifically described embodiment of this invention without departing from the spirit thereof, such changes and modifications being restricted only by the scope of the following claims.

What is claimed is:

1. A traction supply device for motor vehicles comprising a mat adapted to be placed on the ground forwardly of a wheel of the vehicle with an end entered against the vehicle tire, means connected to such entered end of the mat for attaching the mat to a part of the vehicle, and resilient means included in said connection adapted to be placed under tension when the connection is made to the vehicle and the mat applied in initial position to the ground in front of the tire.

2. In a traction supply device for motor vehicles, a spring having means for attaching the same to a part of the vehicle rearwardly of a wheel thereof, a pair of leaders attached to the forward portion of such spring and extending to opposite sides of said wheel, the inner leader being detachably connected with said spring, and a traction mat adapted to be placed on the ground in front of the wheel to which the forward ends of said leaders are in balance attached, the link of said leaders and spring being such as to cause the spring to be placed under tension when initially fitting the mat to its original position in front of the wheel.

3. In a traction supply device as claimed in claim 2, a clasp hook on the inner forward leader detachably connected with said spring, and means for passing about from the front to the rear of the wheel and upon the inside of the same to carry said hook to the spring and affix said hook to said spring.

4. A traction supply device as claimed in claim 2, in which a reacher hook having a handle shank and bill with the shank curved to pass inside the wheel from front to rear, the bill adapted to engage a clasp hook of the inner leader and to carry said hook to and to engage the same with said spring.

5. For use in connection with a mat for giving traction to automobiles, means to connect the rear portion of the mat with the rear bumper comprising a leader adapted to be looped about the bumper, a ring adjustably mounted on said leader, a clasp hook on the free end of the leader adapted to be detachably engaged in said ring, and means for anchoring said leader to a mat placed in front of the rear wheel of the automobile.

JOSEPH PIATAK.

REFERENCES CITED

The following references are of record in the file of this patent:

UNITED STATES PATENTS

| Number | Name | Date |
|---|---|---|
| 1,689,885 | McLean | Oct. 30, 1928 |
| 1,617,271 | Penfield | Feb. 8, 1927 |
| 1,606,622 | Fogarty | Nov. 9, 1926 |
| 1,625,028 | Hyatt | Apr. 19, 1927 |
| 1,347,405 | Robbins et al. | July 20, 1920 |
| 1,590,434 | Fischer | June 29, 1926 |
| 2,225,828 | Goschall | Dec. 24, 1940 |